United States Patent [19]
Huotari

[11] Patent Number: 5,987,323
[45] Date of Patent: Nov. 16, 1999

[54] STARTING A SHORT MESSAGE TRANSMISSION IN A CELLULAR COMMUNICATION SYSTEM

[75] Inventor: Seppo Huotari, Espoo, Finland

[73] Assignee: Nokia Telecommunications OY, Espoo, Finland

[21] Appl. No.: 08/776,071

[22] PCT Filed: Jul. 17, 1995

[86] PCT No.: PCT/FI95/00405

§ 371 Date: Apr. 1, 1997

§ 102(e) Date: Apr. 1, 1997

[87] PCT Pub. No.: WO96/03843

PCT Pub. Date: Feb. 8, 1996

[30] Foreign Application Priority Data

Jul. 20, 1994 [FI] Finland ..................................... 943447

[51] Int. Cl.⁶ .................................................. H04B 7/26
[52] U.S. Cl. ........................................... 455/433; 455/466
[58] Field of Search ..................................... 455/422, 432, 455/433, 435, 458, 466, 462, 517, 518, 521, 414

[56] References Cited

U.S. PATENT DOCUMENTS 5,794,142  8/1998  Vanttila et al. ............................. 455/466
5,806,000  9/1998  Vo et al. .................................. 455/466

FOREIGN PATENT DOCUMENTS

94/07338  3/1994  WIPO .
95/12933  5/1995  WIPO .

OTHER PUBLICATIONS

ETSI–GSM Technical Specification, GSM 03.40 Version 3.5.0, European digital cellular telecommunication system (phase 1); "Technical Realization of the Short Message Service—Point–to Point", 1992, pp. 13–15.

ITG–Fachbericht 124, Informationstechnische Gesellschaft Fachtagung, Mobile Kommunikation,Vortrage der ITG–Fachtagung, Sep. 27–29, 1993 in Neu–Ulm, vde–verlag gmbh, Berlin, Hientz, Michael et al : "Der short message service—ein neuer dienst der digitalen mobilkommunikation " pp. 517–526.

ETSI/TC GSM, "Recommendation GSM 01.02, General Description of a GSM PLMN", Mar. 1990.

ETSI/TC GSM, "Report GSM 11.30, Mobile services Switching Centre", Jan. 1990.

ETSI/TC GSM, "Report GSM 11.31, Home Location Register Specification", Jan. 1990.

ESTI/TC GSM, "Report GSM 11.32, Visitor Location Register Specification", Jan. 1990.

ETSI TC–SMG, European digital cellular telecommunications system (Phase 2); Technical realization of the short Message Service (SMS) Point to Point (PP) (GSM 03.40), Oct. 1993.

*Primary Examiner*—Thanh Cong Le
*Attorney, Agent, or Firm*—IP Group of Pillsbury Madison & Sutro LLP

[57] ABSTRACT

A method for starting a short message transmission in a cellular communication system, a cellular communication system, and a cellular communication system subscriber location register includes the subscriber location register which stores information on the fact that at least one short message service center stores short messages to be transmitted to a subscriber to whom the messages cannot be transmitted for the time being, and the subscriber location register of the subscriber which transmits to at least one short message service center a short message transmission starting message when it is again possible to transmit short messages to the subscriber. In order that short messages can be transmitted to subscribers selectively, the subscriber location register maintains short message service center and subscriber-specific information on the conditions under on which the short message service center is to be transmitted short message transmission starting messages.

14 Claims, 3 Drawing Sheets

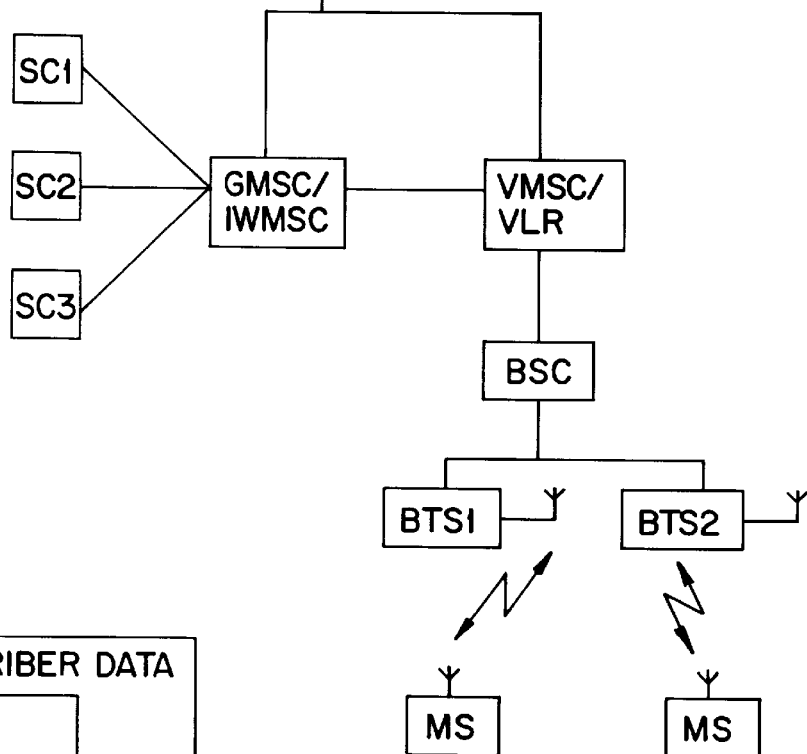
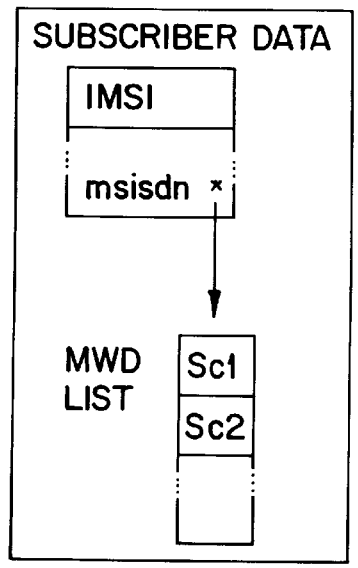
FIG. 3
FIG. 2

STARTING A SHORT MESSAGE TRANSMISSION IN A CELLULAR COMMUNICATION SYSTEM

This application is the national phase of international application PCT/FI95/00405 filed Jul. 17, 1995 which designated the U.S.

FIELD OF THE INVENTION

The present invention relates to a method for starting a short message transmission in a cellular communication network, a corresponding cellular communication system, and a cellular communication system subscriber location register. In this method, the subscriber location register stores information based on the fact that at least one short message service center stores short messages to be transmitted to a subscriber, to whom these messages cannot be transmitted for the time being, and the subscriber location register of the subscriber transmits to the at least one short message service center, a short message transmission starting message, when it is again possible to transmit short messages to the subscriber.

BACKGROUND OF THE INVENTION

Today, different cellular communication or mobile telephone systems are used and planned in which the geographical area covered by a system is divided into smaller separate radio areas, i.e., cells, so that when located in a cell, a radio phone or a mobile phone communicates with the fixed network via the fixed radio station located in the cell. The mobile phones included in the system may freely move within the system area from a cell into another. One of these systems is the digital mobile phone system GSM (Global System for Mobiles).

As to cellular communication networks, it is known practice to transmit short messages via a short message service center separate from the cellular communication network. One of these systems for transmitting and forwarding short messages is described in ETSI GSM system recommendation "GSM 03.40, February 1992, Technical Realization of Short Message Services Point to Point, ETSI/PT". It describes the connection of a short message service center to the mobile exchange of a cellular communication network and the operation of this short message service center when the center transmits and forwards short messages from outside the cellular communication network and from a cellular communication network subscriber (subscriber A) to another network subscriber (subscriber B), or to a means of communication which is capable of receiving and/or transmitting short messages and which is located outside the network.

When a short message service center attempts to transmit a short message to a subscriber B. and the subscriber B is not reachable, a Messages-Waiting-Data-List according to GSM recommendation 03.40, i.e., an MWD list, is established in the home location register, which stores a list, subscriber B-specific, of the addresses of those short message service centers which store short messages to be delivered to subscribers B. Accordingly, when subscriber B registers in the network, i.e., it is possible to transmit a short message to the mobile phone of the subscriber B since the visitor location register in the area which subscriber B registers itself transmits a notification of the arrival of the subscriber B in the network to the home location register of the subscriber B. The home location register of the subscriber B, i.e., the subscriber location register, thus starts to transmit notifications, i.e., short message transmission starting messages, or, Alert messages (Alert), to the short message service centers presented in the Messages-Waiting-Data-List of the subscriber. The starting messages inform the short message service centers that subscriber B has become active in the cellular communication network area and that it is worth attempting to transmit a short message to the mobile phone of subscriber B. A situation of this type may occur, for instance, when the subscriber has switched off her mobile phone for the night and switches it on in the morning, or correspondingly, if the subscriber uses a mobile phone at work and switches on her mobile phone at the beginning of working hours.

A typical problem of prior art solutions is that the transmission capacity of short messages from short message service centers to a subscriber is very restricted. The transmission capacity on the radio path is only 10–100 bytes/second, which is significantly less than what is used, for instance, in modem communication between computers. However, it has been required that short message transmissions should be capable of forwarding even electronic mail-type messages to subscribers. The transmission capacity of short messaged is typically a crucial characteristic in the situations described above. Thus, when a subscriber B has suddenly become reachable, attempts are made to transmit to subscriber B a large number of short messages, which have been stored in possibly several short message service centers. The short messages suddenly transmitted to the subscriber thus congest the short message reception of the subscriber, i.e., the mobile phone, and possibly also the transmission link or radio path to the subscriber. As a result of the congestion, a new and possibly urgent short message for the subscriber may not reach its destination quickly enough because the short message reception of the subscriber, i.e., the mobile phone, is congested. Important short messages are thus lost, in a manner of speaking, in the multitude of less important, queuing short messages.

Another problem of prior art solutions, which occurs when short messages can be transmitted again to the subscriber B after a pause, is that the short messages intended for subscriber B arrive in succession to subscriber B and disturb the user of the subscriber station with their arrival and possible audio signals connected to the arrival for a very long time, i.e., as long as the subscriber has short messages to receive. This disturbing period may last for an extremely long time due to the low transmission speed of the short message-transmitting radio path, according to the GSM specification, and to the fact that the subscriber has to receive all short messages. The aggravation of the subscriber is naturally added to by the fact that the subscriber has no possibility of selecting from the short messages those short messages the transmitters, i.e., short message service centers, of which said subscriber considers the most important.

Yet another problem of prior art solutions is that subscriber B cannot select or eliminate arriving short messages in a desired manner, but must receive all the short messages transmitted to it.

One prior art method for starting a short message transmission in a cellular communication system, a cellular communication system, and a cellular communication system subscriber location register has been disclosed in Finnish Patent Application 924,198, which corresponds to International Patent Application PCT/FI93/00373.

SUMMARY OF THE INVENTION

An object of the present invention is to obviate a problem caused by an insufficient transmission capacity in transmitting short messages from short message service centers to subscribers and by the fact that the short messages transmitted to a subscriber are congested when the subscriber has suddenly entered a state in which it can be transmitted short messages. In addition to this, a problem is caused by the fact that important short messages to be delivered to the subscribers remain undelivered or arrive too late because they are transmitted only when the subscriber has received the congested short messages, which were transmitted first.

In addition to the above, an object of the invention is to obviate a problem caused by the fact that the subscriber cannot select the short messages transmitted to him and cannot thus limit the number of the short messages transmitted to him.

Furthermore, an object of the invention is to ensure that important short messages reach their destination even when there are suddenly a large number of short messages to be transmitted to the subscriber.

In this method for starting a short message transmission in a cellular communication system, information on the conditions on which the short message service center is transmitted short message transmission starting messages is maintained at that specific to the short message service center and to the subscriber in the subscriber location register.

The cellular communication system of the present invention includes a subscriber; at least one short message service center which transmits short messages to the subscriber via the cellular communication network and which stores short messages when the subscriber is not reachable; the subscriber location register of the subscriber contains information on the fact that the at least one short message service center stores short messages to be transmitted to the unreachable subscriber, the subscriber location register including a transmitter which transmits a short message transmission starting message to the at least one short message service center when it is possible again to transmit short messages to the subscriber.

In the cellular communication system of the invention, the subscriber location register includes a database, in which information on the conditions on which the short message service center is transmitted short message transmission starting messages is maintained specific to the short message service center and to the subscriber.

The subscriber location register of a cellular communication system of the present invention includes a transmitter which transmits a short message transmission starting message to at least one short message service center. The subscriber location register of the invention includes a database, in which information on the conditions on which the short message service center is transmitted short message transmission starting messages is maintained specific to the short message service center and to the subscriber.

The invention is based on the idea that in the subscriber location register of the cellular communication system, for instance, in a home location register (HLR), information is maintained in a database on the conditions, i.e., when, in which order, and for the subscriber situated in which location, on which a short message service center storing short messages intended for the subscriber is transmitted short message transmission starting messages, i.e., Alert messages. This brings about a situation where the subscriber location register transmits the short message transmission starting messages, i.e., Alert messages, concerning a particular subscriber B. i.e., the receiver, to those short message service centers which are actually desired to transmit short messages to subscriber B. Starting messages are selectively transmitted to short message service centers based on the maintained information so that starting messages are transmitted to only those (first) short message service centers which are desired to transmit short messages. Correspondingly, starting messages are not transmitted to those (second) short message service centers which are not desired to transmit short messages, even if those (second) short message service centers contain short messages to be transmitted to subscriber B. The invention prioritizes the transmission of short message transmission starting messages so that when it is possible to transmit short messages to a subscriber after a pause, the subscriber is first transmitted important starting messages only.

An advantage of this method for starting a short message transmission in a cellular communication system, cellular communication system, and cellular communication system subscriber location register is that the congestion of short messages on the radio path when it is possible again to start transmitting short messages to a subscriber after a pause is prevented.

Another advantage of the invention is that it is possible to avoid a situation where the mobile station of a subscriber has to receive, in succession, a large number of short messages stored in the network with the result that the user of the -subscriber station is disturbed and gets weary of large number of short messages in receiving a succession.

Yet another advantage of the invention is that it enables a subscriber to select those short messages which the subscriber desires to receive at her own subscriber station, i.e., mobile station.

A further advantage of the invention is that it provides a subscriber B who is receiving short messages, with the ability to restrict the number of the short messages received, for instance, based on which short message service center has transmitted or forwarded the short message.

Furthermore, an advantage of the invention is that it offers a subscriber the ability to divide short messages based on her own geographical location into those which the subscriber desires to receive within a certain period of time, and correspondingly, into those which the subscriber does not want to receive.

BRIEF DESCRIPTION OF THE FIGURES

In the following, the invention will be described in more detail with reference to the accompanying drawings, in which

FIG. 2 shows the hierarchy of the subscriber data of a subscriber home location register, i.e., a subscriber location register;

FIG. 3 shows a block diagram of the cellular communication system of the invention and the subscriber location register thereof;

DETAILED DESCRIPTION OF THE INVENTION

In the following, the method of the invention will be described as applied in the digital GSM mobile telephone system, which is the preferred field of application of the invention. The method of the invention can, however, also be applied in other radio systems of a similar type or in adaptations of the GSM system. The basic structure and facilities of the GSM mobile telephone system are known to ones skilled in the art and defined relatively precisely in the GSM system specifications, especially in "GSM Recommendations 01.02; 11.30; 11.31; 11.32; and 03.40".

Figure 1:
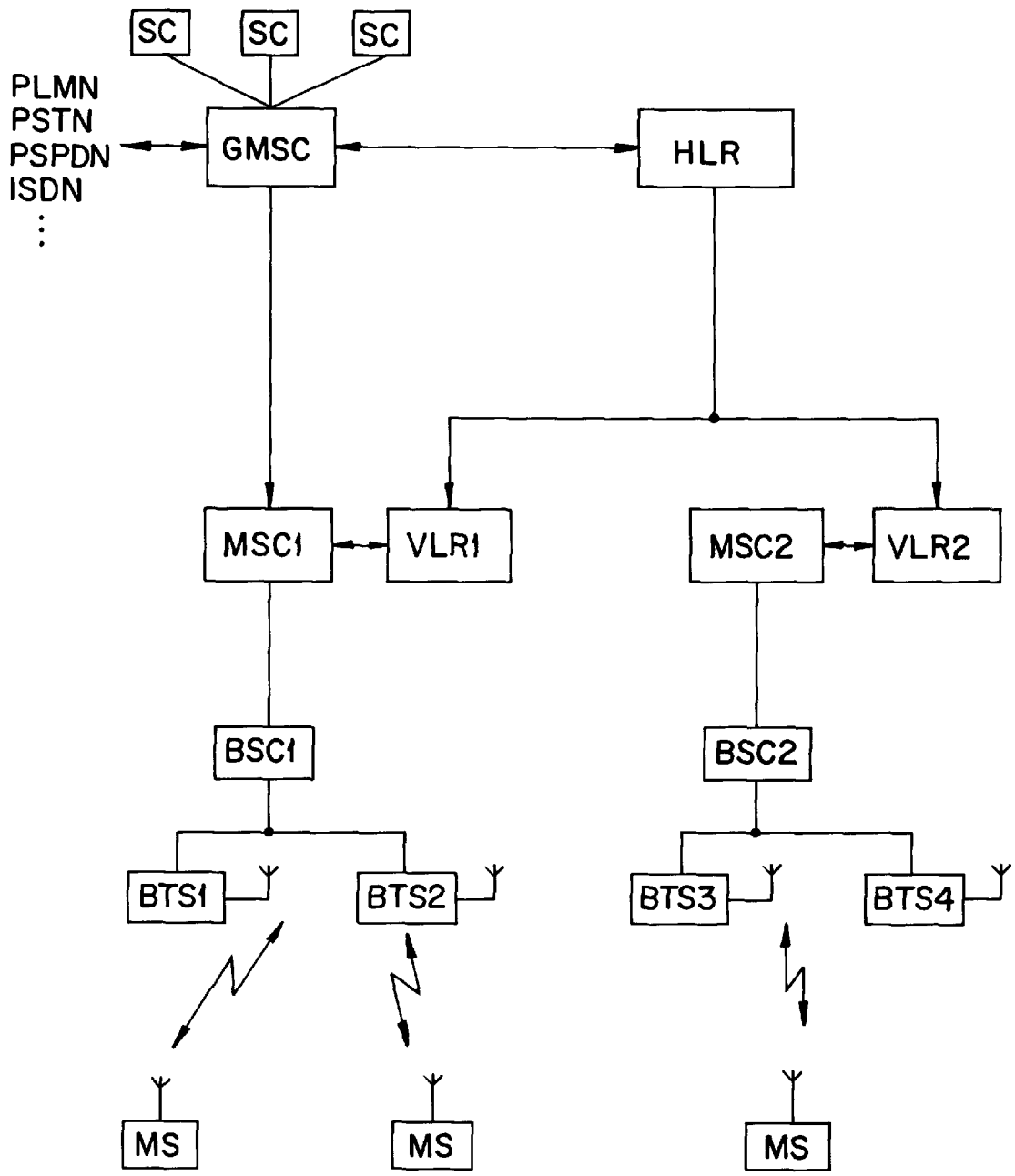
FIG. 1 is a schematic illustration of a cellular communication system in which the method and mobile exchange of the invention can be used.

A GSM network, which is shown in FIG. 1, usually comprises one home location register HER, which is a database in which the data of a mobile phone, such as the location data, is permanently stored. The home location register performs basically the same tasks as the subscriber location register of the invention. The system also comprises several visitor location registers VLR, of which there are one or more for one exchange area. A visitor location register VLR is a database in which the data of a mobile phone is stored for the period that the mobile phone visits the VLR area, i.e., the location area of the mobile phone. The VLR knows the location of the mobile phone MS with an accuracy of one location area As for the HLR, it knows which VLR the mobile phone MS is visiting and gives mobile phone MS—terminating calls routing information to the telephone network, i.e., the VLR address of the location area of the subscriber B. The HLR obtains the necessary routing information from the VLR. The HLR and VLR have only a signaling connection with the other components of the mobile telephone network. In the system according to FIG. 1, each exchange area has its own visitor location register VLR, which is connected to the mobile or radio telephone exchange MSC of the exchange area. In the solution shown in the figure, two exchange areas are illustrated, one comprising a mobile exchange MSC1 and a visitor location register VLR1, and the other comprising a mobile exchange MSC2 and a visitor location register VLR2. Under both exchange areas, there are one or more location areas, and in each location area, the traffic is controlled by a base station controller (BSC), which controls several fixed radio stations, i.e., base transceiver stations (BTS). Each of the above-mentioned radio cells comprises one base station BTS, and one base station controller BSC serves several cells. A mobile phone MS located in a cell establishes a two-way radio connection with the base transceiver station BTS of said cell. There are both a signaling connection and speech channels between the base station controller BSC and the mobile exchange MSC. Correspondingly, under the other exchange area MSC2 is a location area with a base station controller BSC2 and base stations BTS3 and BTS4.

A GSM network is usually connected to other networks, such as a public-switched telephone network PSTN, another mobile telephone network PLMN, a packet-switched public data network PSPDN or, an ISDN network ISDN or short message service center SC, via a certain mobile exchange referred to as a gateway exchange GMSC. One or more (all) mobile exchanges of the network can act as a gateway exchange GMSC. From the gateway exchange GMSC, it is possible to switch a speech channel connection to any other mobile exchange MSC of the network. The gateway exchange GMSC also has a signaling connection with the home location register HLR. The home location register HLR has a signaling connection with the visitor location registers VLR. Alternatively, an exchange of another data transmission system, for instance an ISDN exchange, can also act as a gateway exchange. FIG. 1 also shows several short message service centers SC, which transmit a short message via the cellular communication network to the mobile phone MS of the subscriber B and which, during the time the subscriber is not reachable, store the short messages intended to be transmitted later to the subscriber.

FIG. 2 shows the hierarchy of the subscriber data of a subscriber home location register, i.e., a subscriber location register. The subscriber data is stored based on the subscriber's international mobile subscriber identity IMSI in the home location register of the subscriber as subscriber-specific records, which stores the supplementary services ordered by the subscriber in addition to the basic service of the subscriber. The basic services of a subscriber are the normal telephone service, short message transmission and reception services, and different data transmission services. The supplementary services of a subscriber include, for instance, call forwarding and call restriction services, and call waiting service. One basic service of the subscriber can correspond to one MSISDN number, msisdn of the subscriber, i.e., the "directory number" of a certain teleservice of the subscriber. In the GSM system, it is possible to transmit short messages to a subscriber based on any directory number, i.e., the corresponding basic service of the subscriber, or, the MSISDN number, of the same subscriber. Each MSISDN number of the subscriber and the basic service corresponding thereto has its own MAD (Messages-Waiting Data) list, which stores the addresses Sc1, Sc2 of those short message service centers SC which have attempted to transmit short messages to the subscriber basic service indicated by the MSISDN number (directory number), but the transmission has failed for some reason, for instance because the subscriber has not been reachable due to the fact that the terminal equipment of the subscriber has been located outside the coverage area of a radio network base station, i.e., in a shadow area, or due to the fact that the terminal equipment of the subscriber has been switched off.

FIG. 3 shows a subscriber MS connected to the cellular communication system via a base station BTS1, BTS2, base station controller BSC, and the mobile exchange VMSC/VLR of the location area of the subscriber. One or more short message service centers SC1, SC2, SC3 store short messages to be transmitted to the subscriber MS. The short message service centers are connected to the cellular communication network via a gateway exchange GMSC/IWMSC. The visitor location register VLR of the location area of the subscriber stores information (Messages-Waiting-Flag) on the fact that a short message service center SC stores short messages to be transmitted to the subscriber. A subscriber location register 10, which corresponds to a home location register HLR in the GSM system, contains an HLR function block 3. The home location register of the invention also comprises a database in which information is maintained specific to the short message service center and to the subscriber, on the conditions on which the short message service center storing short messages of the subscriber is transmitted short message transmission starting messages. The database may be located in the subscriber database 11 as shown in FIG. 3. The starting messages (Alert) start the transmission of short messages from the short message service centers SC1, SC2, SC3 to the subscribers MS. When the subscriber MS has become reachable in the cellular communication network, the subscriber location register 10 obtains a notification thereof from the visitor location register VLR, because in the visitor location register there has been information, i.e., a set Messages-Waiting-Flag, on the fact that the short message service center SC contains short messages waiting to be transmitted to the subscriber MS. The HLR function block 3 of the subscriber location register thus requests information from the database 11 on the conditions on which the subscriber should be transmitted short messages, i.e., on what conditions the short message service center storing short messages intended for the subscriber should be transmitted said starting messages. It should be noted that the teleoperator controls the conditions included in said information maintained in the subscriber location register 10; HLR so that the subscriber location register 10; HLR transmits short message transmission starting messages (SMS Alert) to the short message service centers SC1, SC2, SC3 desired by the operator. After having made the request, the HLR function block 3 receives the conditions and decides based on the conditions if a short message transmission to the subscriber should be started. The effect of different conditions on a short message transmission will be described below. The HLR function block then controls according to the conditions the transmitter 1 transmits short message transmission starting messages, i.e., the starting message transmission functions, to transmit the short message starting messages of a certain subscriber, i.e., Alert messages in the case of a GSM network, to those short message service centers SC which have short messages to be transmitted to the subscriber MS and to which starting messages should be transmitted according to the conditions. The starting message transmitter 1 thus transmit short message starting messages so that the conditions which are maintained in the database and which are in accordance with the invention are observed. A short message service center SC1, first according to the conditions, included in the Messages-Waiting-Data-List of the subscriber location register 10; HLR, associated with the IMSI, and corresponding to the subscriber's directory number, i.e., MSISDN number, is transmitted one short message transmission starting message, after which the starting message transmitter 1 waits for a predeterminable period before transmitting a second short message transmission starting message to the next short message service center SC2. In the GSM system, for instance, starting messages are transmitted so that the transmitter 1 requests the mobile applications part MAP communication protocol 2 located in the subscriber location register 10; HLR to transmit a short message transmission starting message to the short message service center SC, whereby the MAP carries out the transmission of the starting message.

FIGS. 4–7 show a subscriber or subscriber station Mobile MS, the home location register HLR of said subscriber, and one or more short message service centers SC, which store short messages intended for the subscriber and which, according to the invention, transmit the short messages to the subscriber in accordance with predetermined conditions.

Figure 4:
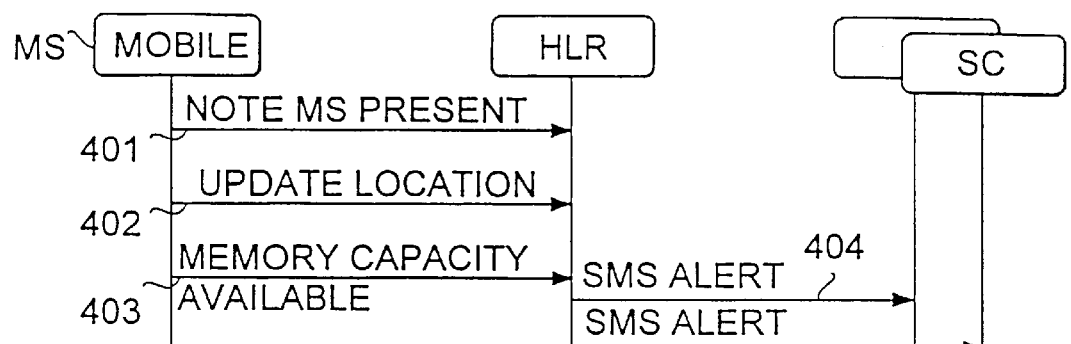
FIG. 4 shows a signaling diagram of a situation where a subscriber has become reachable, and only part of the short message transmission starting messages are transmitted.

FIG. 4 shows a signaling diagram of a situation where the subscriber has become reachable, and only part of the short message transmission starting messages are transmitted. According to the invention, the subscriber location register HLR transmits short message transmission starting messages 404 to desired short message service centers in accordance with the conditions according to the invention. The transmission of the starting messages is started when the subscriber either transmits to her subscriber location register HLR a notification of the fact that the subscriber can be reached by the network again, i.e., a Note MS Present message 401, performs a location updating, i.e., transmits an Update Location message 402, or notifies the subscriber location register that the subscriber has memory capacity available by a Memory Capacity Available message 403.

Figure 5:
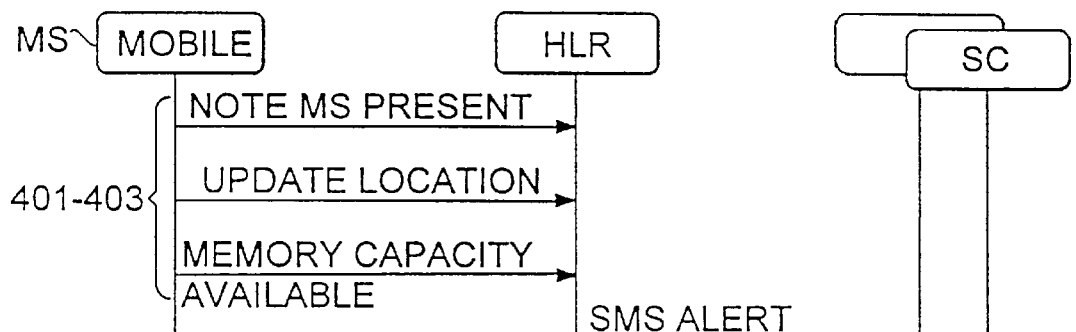
FIG. 5 shows a signaling diagram of a situation where a subscriber has become reachable, and short message transmission starting messages are transmitted to only certain short message service centers.

FIG. 5 shows a signaling diagram of a situation where a subscriber as become reachable, and short message transmission starting messages are transmitted to only certain short message service centers. The transmission of the starting messages is thus started by one of the above-mentioned messages 401–403 transmitted by the subscriber. The transmission of the starting messages can thus be prevented at the subscriber's request to all or part of the short message service centers. It is also possible that alerts destined for the addresses of only certain service centers are allowed. In FIG. 5, this situation is illustrated by the fact that a starting message SMS Alert 505 is not going to another service center even if it goes to a desired service center.

Figure 6:
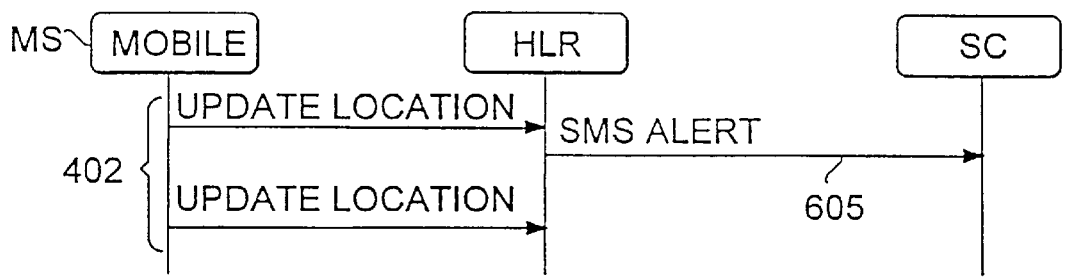
FIG. 6 shows a signaling diagram of a situation where a subscriber has become reachable, and short message transmission starting messages are transmitted to only certain short message service centers, depending on the subscriber's location.

FIG. 6 shows a signaling diagram of a situation where a subscriber has become reachable, and short message transmission starting messages are transmitted to only certain short message service centers, depending on the subscriber's location. In the situation shown in FIG. 6, the transmission of starting messages is prevented based on the location of the receiving subscriber. This is based on the fact that the home location register HLR knows the location of the receiving subscriber MS with an accuracy of a mobile exchange, i.e., an MSC. Thus, a subscriber MS, for instance, which is located outside a certain area, for instance outside the service area of its own home mobile exchange, is not transmitted short messages, or short messages to be transmitted, located in a certain service center, are not transmitted to a certain subscriber. This characteristic can be used, for instance, when the subscriber is moving abroad and does not thus want to receive short messages from her home country. It is also possible to implement selective reception of short messages in such a manner that when moving abroad, the subscriber receives short messages only from the country she is located in. Naturally, it is also possible to implement other different and alternative solutions in selective short message reception.

Figure 7:
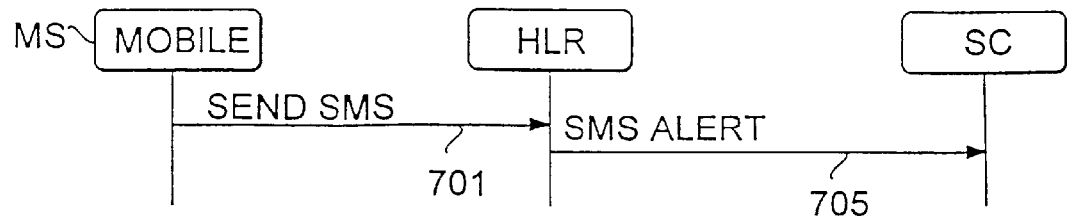
FIG. 7 shows a signaling diagram of a situation where a subscriber requests and controls the transmission of short message transmission starting messages.

FIG. 7 shows a signaling diagram of a situation where a subscriber requests and controls the transmission of short message transmission starting messages. In this embodiment, the subscriber, i.e., the mobile station or subscriber station, transmits to its subscriber location register HLR a control instruction, i.e., a Send SMS message 701, by which the subscriber commands the subscriber location register to transmit desired short message transmission starting messages 705 to those short message service centers SC which have short messages to be transmitted to said subscriber MS. In this embodiment, the subscriber location register (home location register) HLR of the subscriber does not thus start transmitting starting messages after having received from the subscriber a Note MS Present message 401 or a location updating message Update Location or a notification of the fact that the subscriber has memory available, but starting messages are started to be transmitted only at the subscriber's specific request Send SMS.

The drawings and the description relating thereto are only intended to illustrate the idea of the invention. In their details, the method of the invention for starting a short message transmission in a cellular communication system, cellular communication system, and cellular communication system subscriber location register may vary within the scope of the claims. Even if the invention has been described above mainly as applied in the GSM system, it can also be used in a radio system of a different type.

I claim:

1. A method for starting a short message transmission in a cellular communication network, comprising:

storing information in a subscriber location register based on the fact that at least one short message service center stores short messages to be transmitted to a subscriber to whom said short messages cannot be transmitted for the time being;

transmitting from said subscriber location register of said subscriber to said at least one short message service center, a short message transmission starting message when it is possible again to transmit short messages to said subscriber, wherein information on conditions under which said short message service center is transmitted short message transmission starting messages is maintained specific to said short message service center and to said subscriber in said subscriber location register.

2. The method according to claim 1, wherein said subscriber location register transmits said short message transmission starting messages concerning one subscriber to desired short message service centers, selectively, based on said maintained information so that starting messages are transmitted to only first short message service centers, which are desired to transmit short messages, and starting messages are not transmitted to second short message service centers, which are not desired to transmit short messages, even if said second short message service centers contain short messages to be transmitted to said subscriber.

3. The method according to claim 1, wherein said subscriber controls said conditions included in said information maintained in said subscriber location register so that said subscriber location register transmits short message transmission starting messages to said short message service centers desired by said subscriber.

4. The method according to claim 3, wherein in response to a control instruction transmitted by said subscriber, said subscriber location register does not transmit said starting messages.

5. The method according to claim 1, wherein an operator controls said conditions included in said information maintained in said subscriber location register so that said subscriber location register transmits short message transmission starting messages to said short message service centers desired by said operator.

6. The method according to claim 1, wherein said subscriber location register does not transmit said starting messages, if said subscriber is situated in a location other than a desired area.

7. The method according to claim 1, wherein said subscriber location register transmits short message transmission starting messages to desired short message service centers in an order prioritized according to addresses of said short message service centers.

8. A cellular communication system, comprising a subscriber;

at least one short message service center which transmits short messages to said subscriber via a cellular communication network and which stores short messages when the subscriber is not reachable; and a subscriber location register of said subscriber, which contains information based on the fact that said at least one short message service center stores short messages to be transmitted to an unreachable subscriber, said subscriber location register comprising a transmitter which transmits a short message transmission starting message to said at least one short message service center when it is possible again to transmit short messages to said subscriber, wherein the subscriber location register comprises a database, maintaining information on conditions under which said short message service center is transmitted short message transmission starting messages specific to said short message service center and to said subscriber.

9. The cellular communication system according to claim 8, wherein said subscriber location register further comprises a transmitter which transmits short message transmission starting messages to said short message service centers desired by said subscriber at the times desired by said subscriber.

10. A subscriber location register of a cellular communication system, comprising:

a transmitter which transmits a short message transmission starting message to at least one short message service center a database, in which information on conditions under which said short message service center is transmitted short message transmission starting, messages is maintained specific to said short message service center and to said subscriber.

11. The subscriber location register according to claim 10, further comprising:

a transmitter which transmits short message transmission starting messages to said short message service centers desired by said subscriber at times desired by said subscriber.

12. The subscriber location register according to claim 10, further comprising:

a transmitter which transmits short message transmission starting messages to said short message service centers desired by said subscriber in an order prioritized according to said addresses of said short message service centers.

13. The subscriber location register according to claim 10, further comprising:

an inhibitor which prevents transmission of short message transmission starting messages to said short message service centers desired by said subscriber, if said subscriber is situated in a location other than a desired area.

14. The subscriber location register according to claim 10, wherein said subscriber location register is a GSM system home location register.

* * * * *